(12) United States Patent
Olgaard et al.

(10) Patent No.: US 8,576,947 B2
(45) Date of Patent: Nov. 5, 2013

(54) SYSTEM AND METHOD FOR SIMULTANEOUS MIMO SIGNAL TESTING WITH SINGLE VECTOR SIGNAL ANALYZER

(75) Inventors: Christian Volf Olgaard, Saratoga, CA (US); Ruizu Wang, San Ramon, CA (US)

(73) Assignee: LitePoint Corporation, Sunnyvale, CA (US)

( * ) Notice: Subject to any disclaimer, the term of this patent is extended or adjusted under 35 U.S.C. 154(b) by 296 days.

(21) Appl. No.: 13/089,945

(22) Filed: Apr. 19, 2011

(65) Prior Publication Data

US 2012/0269288 A1  Oct. 25, 2012

(51) Int. Cl.
*H03C 3/00* (2006.01)
(52) U.S. Cl.
USPC ........... 375/302; 375/295; 375/347; 375/296; 375/346; 375/316; 375/259; 375/260
(58) Field of Classification Search
USPC ......... 375/302, 295, 347, 296, 346, 316, 259, 375/260
See application file for complete search history.

(56) References Cited

U.S. PATENT DOCUMENTS

| | | | |
|---|---|---|---|
| 3,713,155 A * | 1/1973 | Jaffe | ............................... 342/92 |
| 4,833,676 A | 5/1989 | Koo | |
| 4,897,842 A | 1/1990 | Herz | |
| 5,138,608 A | 8/1992 | Kucera et al. | |
| 5,910,977 A | 6/1999 | Torresgrossa | |
| 6,753,693 B2 | 6/2004 | Seo et al. | |
| 6,870,392 B2 | 3/2005 | Kilian et al. | |
| 6,896,086 B2 | 5/2005 | Ishizaki et al. | |
| 7,057,518 B2 | 6/2006 | Schmidt | |
| 7,215,934 B2 * | 5/2007 | van Rooyen et al. | ......... 455/133 |
| 7,463,140 B2 | 12/2008 | Schmidt | |
| 7,564,893 B2 | 7/2009 | O'Neill | |
| 7,890,822 B2 | 2/2011 | Behziz et al. | |
| 2006/0073802 A1 * | 4/2006 | Chari et al. | ................. 455/276.1 |
| 2006/0073823 A1 * | 4/2006 | Kent et al. | ..................... 455/423 |
| 2007/0042783 A1 * | 2/2007 | Collados Asensio et al. | 455/450 |
| 2007/0070691 A1 | 3/2007 | Walvis et al. | |
| 2008/0084951 A1 * | 4/2008 | Chen et al. | ................... 375/347 |
| 2009/0185650 A1 | 7/2009 | Ravid et al. | |
| 2010/0123471 A1 * | 5/2010 | Olgaard et al. | ............... 324/754 |

FOREIGN PATENT DOCUMENTS

KR  10-1003924 B1  12/2010

OTHER PUBLICATIONS

Rafati, Hamid and Razavi, Behzad "A New Receiver Architecture for Multiple-Antenna Systems" pp. 357-360.
International Search Report Dated Feb. 21, 2013 for PCT/US2012/032530;4 Pages.
Written Opinion Dated Feb. 21, 2013 for PCT/US2012/032530; 7 Pages.

* cited by examiner

*Primary Examiner* — Kenneth Lam

(57) ABSTRACT

Signal conversion circuitry and method for converting a multiple input, multiple output (MIMO) packet data signal transmission to a plurality of complex data samples for processing by shared test equipment, e.g., a single vector signal analyzer (VSA).

17 Claims, 5 Drawing Sheets

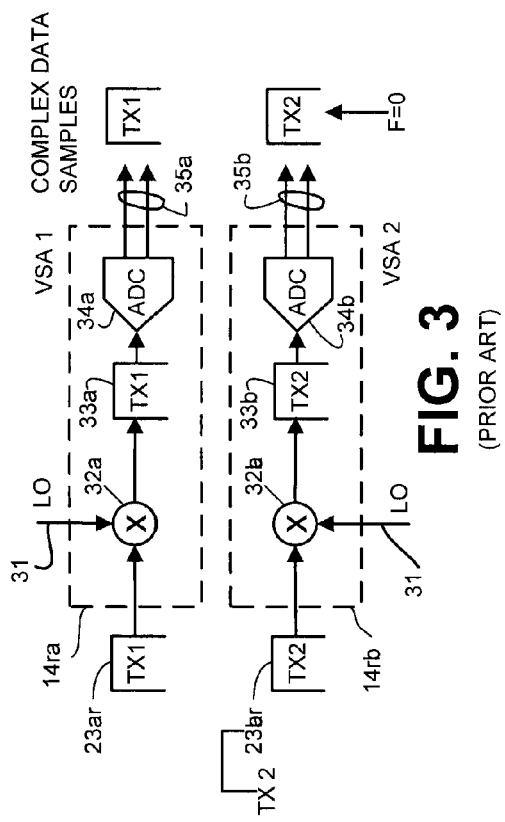
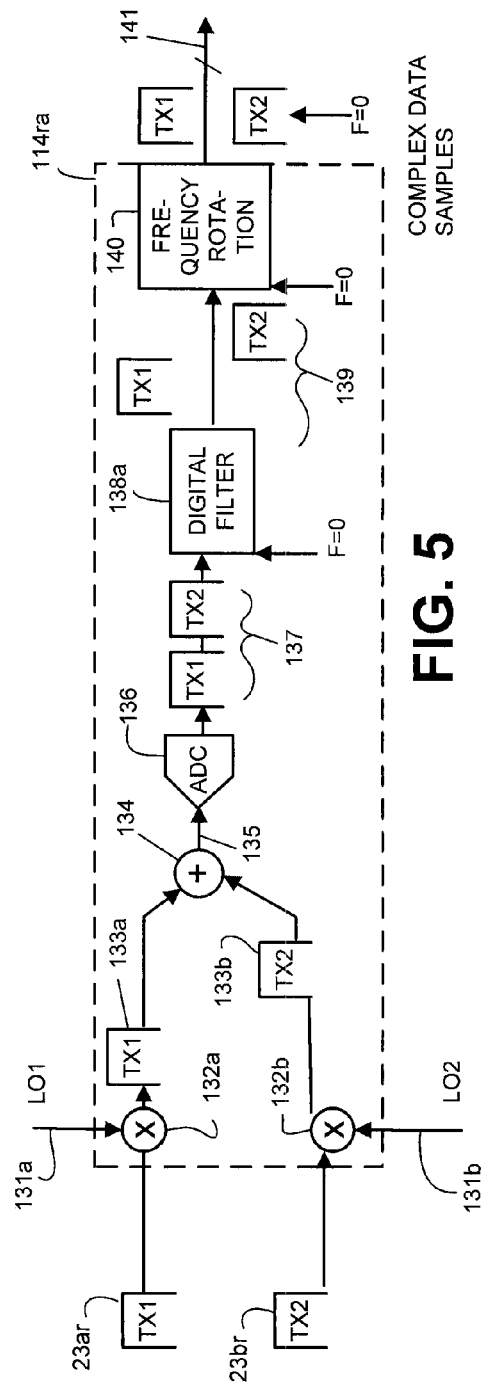

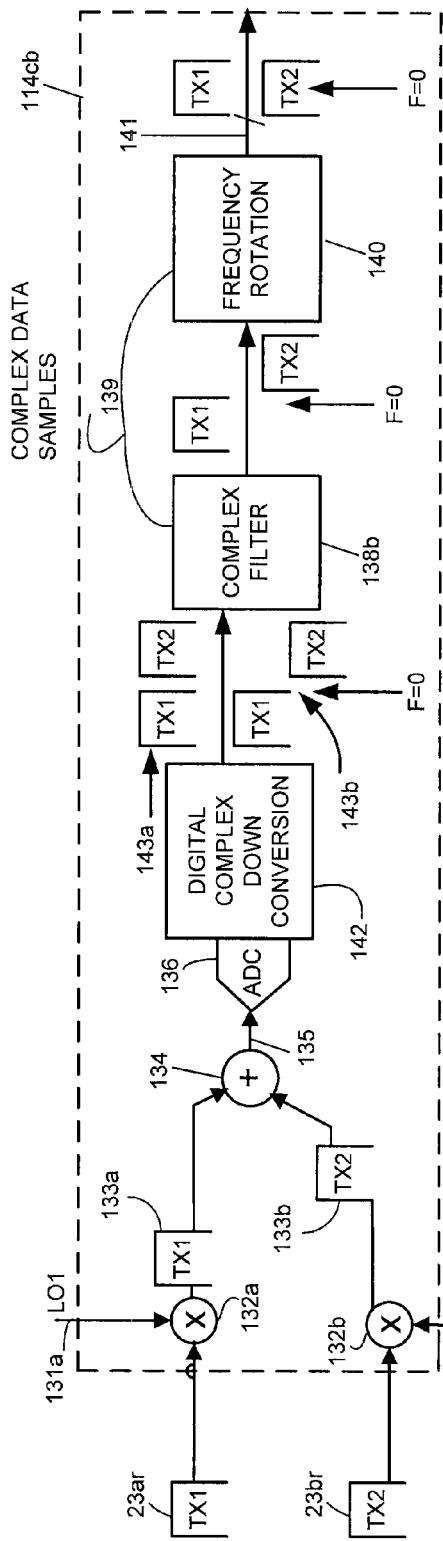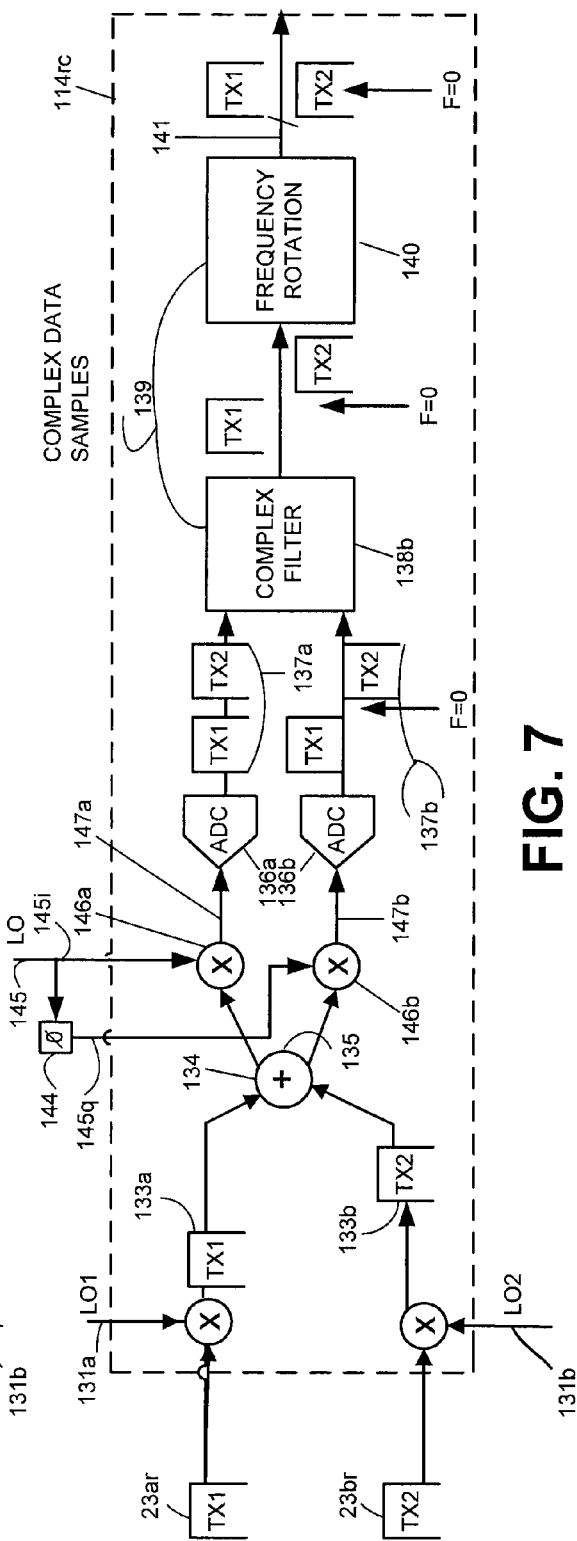

SYSTEM AND METHOD FOR SIMULTANEOUS MIMO SIGNAL TESTING WITH SINGLE VECTOR SIGNAL ANALYZER

BACKGROUND OF THE INVENTION

1. Field of the Invention

The present invention relates to systems and methods for testing MIMO signal systems, and in particular, testing such systems using minimal test equipment.

2. Related Art

Many modern devices utilize wireless signals to send and receive data. Handheld devices in particular make use of wireless connections to provide features including telephony, digital data transfer, and geographical positioning. Although a variety of different wireless-connectivity capabilities are used (such as WiFi, WiMAX, and Bluetooth), in general each is defined by an industry-approved standard (such as IEEE 802.11, IEEE 802.16 and IEEE 802.15, respectively). In order to communicate using these wireless-connectivity capabilities, devices must adhere to the parameters and limitations specified by the associated standards.

Although differences exist between wireless communication specifications (for example, in the frequency spectra, modulation methods, and spectral power densities used to send and receive signals), almost all of the wireless connectivity standards specify the use of synchronized data packets to transmit and receive data. Furthermore, most devices adhering to these wireless communications standards employ transceivers to communicate; that is, they transmit and receive wireless radio frequency (RF) signals.

At any point along the device-development continuum, it may be necessary to test and verify that a device is operating according to the standards associated with its various communication capabilities. Specialized systems designed for testing such devices typically contain subsystems operative to communicate with a wireless communications device during a test. These subsystems are designed to test that a device is both sending and receiving signals in accordance with the appropriate standards. The subsystems must receive and analyze device-transmitted signals and send signals to the device that subscribe to industry-approved standards.

The testing environment generally consists of the device under test (DUT), the tester, and a computer/controller. The tester is generally responsible for communicating with the DUT using a particular wireless communication standard. The computer and tester work together to capture a DUT's transmitted signals and then analyze them against the specifications provided by the underlying standard to test the DUT's transmission capabilities.

In the case of DUT having multiple input/multiple output (MIMO) capabilities, this technology supports simultaneously transmitting discrete RF signals modulated using different data streams while using the same frequency channel. Ordinarily, doing so would cause the signals to interfere with each other making it impossible to decode the resulting composite signals. However, MIMO technology makes use of orthogonal carriers and exaggerated multipath effects on the combined signals received by multiple receivers, which allows the composite signals to be decoded to produce the original discrete data streams.

Ideally, testing the respective transmit performances of the transmitters in a MIMO device, one would isolate the transmitted signals, e.g., using separate coaxial transmission lines, to allow measurements of the individual transmitted signals simultaneously. In the case of a 2×2 MIMO device, for example, one would use two separate VSAs in order to test two simultaneous transmissions. The cost of such testers would therefore increase with the increased number of simultaneous signals to be measured. Accordingly, it would be desirable to find a way to provide for simultaneous measurement and testing of MIMO signals while avoiding significant increases in tester complexity and costs.

SUMMARY OF THE INVENTION

In accordance with the presently claimed invention, signal conversion circuitry and a method are provided for converting a multiple input, multiple output (MIMO) packet data signal transmission to a plurality of complex data samples for processing by shared test equipment, e.g., a single vector signal analyzer (VSA).

In accordance with one embodiment of the presently claimed invention, signal conversion circuitry for converting a multiple input, multiple output (MIMO) packet data signal transmission to a plurality of data samples includes:

input signal conversion circuitry responsive to at least first and second radio frequency (RF) signals and at least first and second local oscillator (LO) signals by converting the at least first and second RF signals to at least first and second frequency converted signals, wherein the first and second RF signals have a common RF carrier frequency, include at least first and second data streams, and form at least a portion of a MIMO packet data signal transmission;

signal combining circuitry coupled to the input signal conversion circuitry to combine the at least first and second frequency converted signals to provide at least one combined signal; and output signal conversion circuitry coupled to the signal combining circuitry and responsive to the at least one combined signal by providing a plurality of data signals having a common nominal frequency and including data samples corresponding to the at least first and second data streams.

In accordance with another embodiment of the presently claimed invention, signal conversion circuitry for converting a multiple input, multiple output (MIMO) packet data signal transmission to a plurality of data samples includes:

input signal converter means for responding to at least first and second radio frequency (RF) signals and at least first and second local oscillator (LO) signals by converting the at least first and second RF signals to at least first and second frequency converted signals, wherein the first and second RF signals have a common RF carrier frequency, include at least first and second data streams, and form at least a portion of a MIMO packet data signal transmission;

signal combiner means for combining the at least first and second frequency converted signals to provide at least one combined signal; and output signal converter means for converting the at least one combined signal to a plurality of data signals having a common nominal frequency and including data samples corresponding to the at least first and second data streams.

In accordance with another embodiment of the presently claimed invention, a method of converting a multiple input, multiple output (MIMO) packet data signal transmission to a plurality of data samples includes:

converting, in accordance with at least first and second local oscillator (LO) signals, at least first and second RF signals to at least first and second frequency converted signals, wherein the first and second RF signals have a common RF carrier frequency, include at least first and second data streams, and form at least a portion of a MIMO packet data signal transmission;

combining the at least first and second frequency converted signals to provide at least one combined signal; and converting the at least one combined signal to a plurality of data signals having a common nominal frequency and including data samples corresponding to the at least first and second data streams.

BRIEF DESCRIPTION OF THE DRAWINGS

FIG. 3 is a functional block diagram of a conventional testing environment using multiple VSAs.

FIG. 5 is a functional block diagram of frequency conversion and signal mixing circuitry in accordance with one embodiment of the presently claimed invention.

FIG. 6 is a functional block diagram of frequency conversion and signal mixing circuitry in accordance with another embodiment of the presently claimed invention.

FIG. 7 is a functional block diagram of frequency conversion and signal mixing circuitry in accordance with another embodiment of the presently claimed invention.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

In accordance with the presently claimed invention, the wide bandwidth of VSAs used in contemporary testers (e.g., 120 MHz for single-capture mask measurements of 802.11n HT40 signals for which the spectrum requirement is 120 MHz wide but the main signal uses only approximately 40 MHz of bandwidth) is advantageously used to capture the wider spectrum of MIMO signals using a single VSA. In so doing, the additional cost of more VSAs can be eliminated and a tester for measuring MiMo signals can be designed for little additional cost over that of a single-signal test system, thereby also reducing the overall cost of testing MIMO devices as only a small amount of additional circuitry is needed for an existing VSA to support captures of MIMO signals. This method can also be used to test multiple individual transmitters, e.g., multiple single input/single output (SISO) devices under test (DUTs) with each having one transmitter, where each transmitter is transmitting its signals at the same frequency. As discussed in more detail below, this method spreads these signals apart within the frequency spectrum, thereby allowing a single wide-bandwidth VSA to analyze them all simultaneously.

Figure 1:
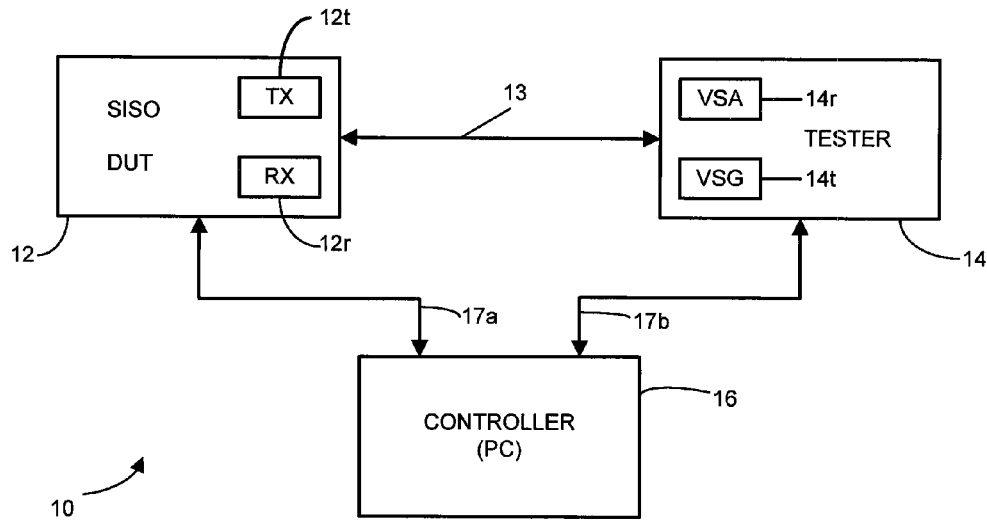
FIG. 1 is a functional block diagram of a conventional testing environment for a single input, single output (SISO) wireless system.

Referring to FIG. 1, a conventional testing environment 10 for a single input, single output (SISO) wireless device under test (DUT) includes the DUT 12, the test equipment, collectively referred to as a tester 14, and a controller 16, often in the form of a personal computer (PC). The DUT 12 and tester 14 communicate via a signal path 13, which in a test environment is typically a cable connection, but can also be a wireless connection established by respective antennas (not shown) at the DUT 12 and tester 14, similar to normal use of the DUT 12 outside of the testing environment 10. The DUT includes a receiver 12r and a transmitter 12t which communicate, via the signal path 13, with a vector signal generator (VSG) 14t and vector signal analyzer (VSA) 14r, respectively, within the tester 14. The controller communicates with the DUT 12 and tester 14 via communication paths 17a, 17b over which the controller 16 sends commands and data to the DUT 12 and tester 14 and receives data in return. In accordance with well-known techniques and procedures, the controller 16 executes the test program by coordinating the respective operations of the DUT 12 and tester 14 as they communicate via the bidirectional communication path 13.

Figure 2:
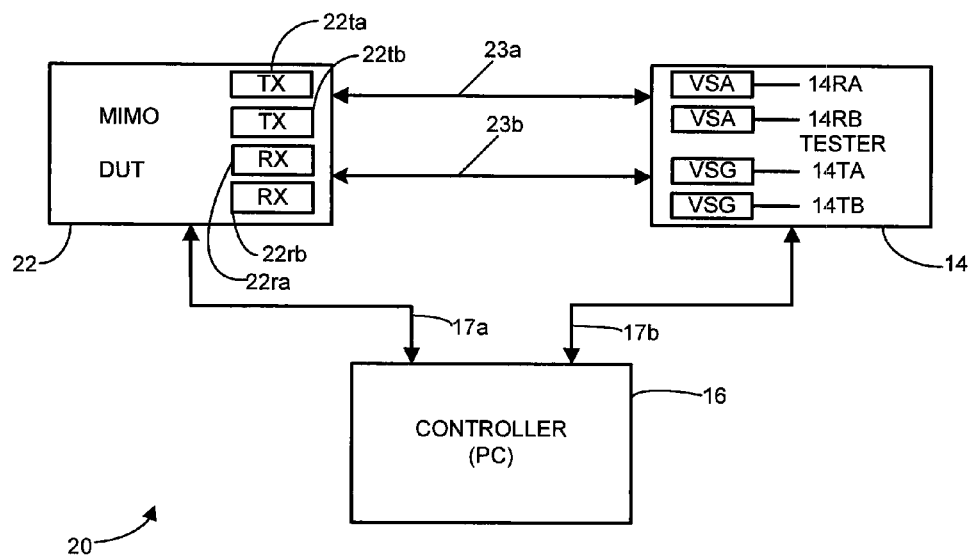
FIG. 2 is a functional block diagram of a testing environment for a conventional multiple input, multiple output (MIMO) wireless device.

Referring to FIG. 2, the testing environment 20 for MIMO DUT 22 also includes the tester 14 and controller 16. In the case of a 2×2 MIMO DUT 22, two receivers 22ra, 22rb and two transmitters, 22ta, 22tb, communicate with two VSGs 14ta, 14tb and two VSAs 14ra, 14rb, respectively, of the tester 14 via two bidirectional communication paths 23a, 23b (typically cable connections in the testing environment 20). Using two VSAs 14ra, 14rb allows the tester 14, in coordination with the controller 16, to simultaneously capture and analyze both MIMO signals from the DUT transmitters 22ta, 22tb. This technique is, of course, scalable in the sense that higher level MIMO systems, such as 3×3, 4×4, etc., can be tested in a similar fashion by simply adding an additional VSG 14t and VSA 14r for each additional MIMO signal. However, each such additional VSG 14t and VSA 14r add to the overall cost of the tester 14, and, since a VSA is often one of the more significant costs of a tester, each additional VSA adds significantly to the overall costs.

Referring to FIG. 3, a conventional embodiment of the tester 14 of FIG. 2 includes two VSAs 14ra, 14rb for processing the received MIMO signal components 23ar, 23br. These signal components 23ar, 23br are down converted in frequency by being mixed in analog signal mixers 32a, 32b with a common local oscillator (LO) signal 31. The corresponding frequency down converted signals 33a, 33b containing the original data streams TX1, TX2 are converted to digital signals by respective analog-to-digital converters (ADCs) 34a, 34b to produce data signals 35a, 35b having a common nominal frequency and including data samples corresponding to the incoming data streams TX1, TX2 for complex domain processing downstream (not shown). (The designators TX1 and TX2 are used to identify the respective radio frequency (RF) signals originating from the DUT transmitters 22ta, 22tb. These RF signals TX1, TX2, while not identical, can each contain one or more data streams, which are processed in accordance with conventional MIMO signal processing after such data streams have been separated.)

In accordance with an alternative conventional embodiment, the received MIMO signal components 23ar, 23br can be sampled and then frequency down converted using frequency rotation to baseband (F=0).

Figure 4:
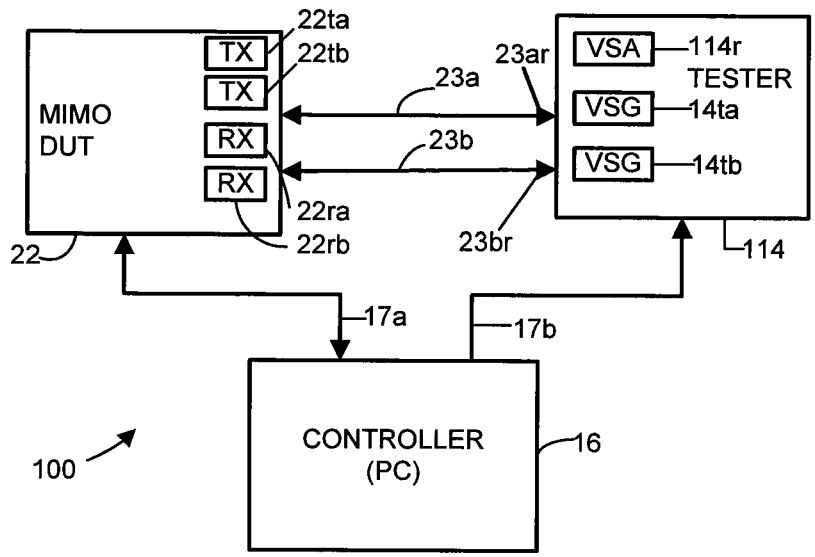
FIG. 4 is a functional block diagram of a testing environment for a MIMO wireless device in accordance with one embodiment of the presently claimed invention for enabling use of a single VSA for simultaneously testing MIMO signal components.

Referring to FIG. 4, a testing environment 100 for testing a MIMO system in accordance with one embodiment of the presently claimed invention includes the MIMO DUT 22 and controller 16, as discussed above, and a tester 114 with a single wide bandwidth VSA 114r having a modified RF input stage (discussed in more detail below) which converts the simultaneous MIMO signal components 23ar, 23br produced by the DUT transmitters 22ta, 22tb (and conveyed by respective signal paths 23a, 23b) to an intermediate frequency (IF) signal for processing.

Referring to FIG. 5, in accordance with an exemplary embodiment 114ra in accordance with the presently claimed invention includes input signal conversion circuitry including analog signal mixers 132a, 132b, signal combining (e.g., summing) circuitry 134, and output signal conversion circuitry including an ADC 136, digital filter circuitry (e.g., implemented in hardware as a band select filter or as a digital signal processor) 138a and digital frequency rotation circuitry (e.g., a digital signal processor) 140, interconnected substantially as shown. The incoming MIMO signal components 23ar, 23br are mixed by their respective mixers 132a, 132b with LO signals 131a, 131b having unequal frequencies (discussed in more detail below) to produce frequency down converted signals 133a, 133b centered at unequal nominal frequencies. These signals 133a, 133b are combined, e.g., summed, in the signal combining circuitry 134. The combined signal 135 is converted by the ADC 136 to a digital signal 137 containing the original data streams TX1, TX2 at unequal nominal frequencies. This signal 137 is filtered by the digital filter circuitry 138a to produce a filtered signal 139. The captured data streams TX1, TX2 contained within this filtered signal 139 are individually rotated in frequency by the frequency rotation circuitry 140 from their respective nominal frequencies to a common frequency (e.g., centered around zero) to produce the normal data signals 141 containing the data samples corresponding to the original data streams TX1, TX2.

Referring to FIG. 6, in accordance with another exemplary embodiment 114rb, the output signal conversion circuitry includes the ADC 136, digital complex down conversion circuitry 142, complex digital filter circuitry 138b, and the frequency rotation circuitry 140, interconnected substantially as shown. Following the conversion of the combined signal 135 to a digital signal, the digital complex down conversion circuitry 142 provides dual frequency down converted signals 143a, 143b, each of which contains the original data steams TX1, TX2. These signals 143a, 143b are filtered by the digital complex filter circuitry 138b to produce the filtered signal 139 which includes the first TX1 and second TX2 data steams having negative and positive nominal frequencies, respectively.

Referring to FIG. 7, in accordance with another exemplary embodiment 114rc, the output signal conversion circuitry includes additional analog signal mixers 146a, 146b, multiple ADCs 136a, 136b, and the complex filter circuitry 138b and frequency rotation circuitry 140 discussed above. The combined signal 135 is mixed in each of the analog signal mixers 146a, 146b with respective phases 145i, 145q provided by a LO signal source 145 and phase shifter 144. The resulting quadrature signals 147a, 147b are converted by their respective ADCs 136a, 136b to corresponding digital signals 137a, 137b containing the original data streams TX1, TX2 at unequal nominal frequencies. These signals 137a, 137b are filtered by the digital complex filter circuitry 138b to produce the filtered signal 139, as discussed above.

As should be apparent to one of ordinary skill in the art, the ordering of the operations of the output signal conversion circuitry can be scheduled in different orders while achieving the desired result. The optimal ordering of operations will depend upon various factors, such as sampling rate, bandwidth of the desired signals, input frequency of the desired signals as compared to the sampling frequency, power consumption, etc. In other words, while the operations of the output signal conversion circuitry in the exemplary VSA embodiments 114ra, 114rb, 114rc of FIGS. 5-7 are analog-to-digital conversion followed by filtering followed by frequency rotation, such operations can be re-ordered to achieve the most efficient implementation for a particular system. For example: analog-to-digital conversion followed by filtering followed by frequency rotation; analog-to-digital conversion followed by frequency rotation followed by filtering; filtering followed by analog-to-digital conversion followed by frequency rotation; frequency rotation followed by filtering followed by analog-to-digital conversion; filtering followed by frequency rotation followed by analog-to-digital conversion; or frequency rotation followed by analog-to-digital conversion followed by filtering. Of course, those operations preceding the analog-to-digital conversion operation would be done in the analog domain, while those operations following the analog-to-digital conversion operation would be done in the digital domain. Each operation can be implemented for performance in accordance with well known analog-to-digital conversion, as well as known digital signal processing operations like filtering and frequency rotation techniques.

Additionally, while the examples discussed above have been in the context of two received data streams 23ar, 23br, it should be readily appreciated that the signal conversion and combining techniques in accordance with the presently claimed invention can be scaled up to convert and combine more than two data streams.

Figure 8:
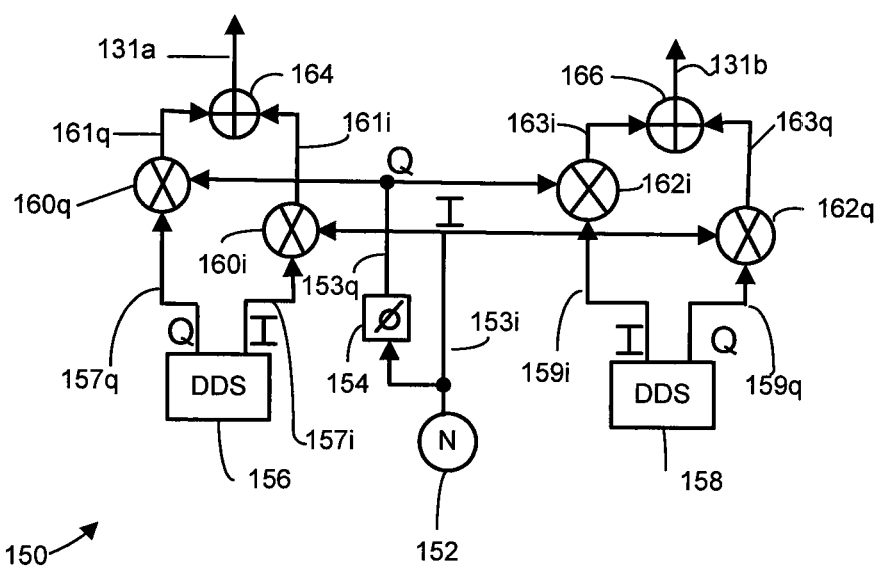
FIG. 8 is a functional block diagram of an exemplary embodiment of local oscillator circuitry for use with the input frequency conversion circuitry of FIGS. 5-7.

Referring to FIG. 8, in accordance with another exemplary embodiment, an input LO signal source 150 for use with the circuitry of FIGS. 5-7 can include an analog LO signal source 152 (e.g., a conventional phase lock loop (PLL) with a voltage control oscillator (VCO) in accordance with well known techniques) and a quadrature phase shifting circuit 154 that together produce in-phase (I) 153i and quadrature phase (Q) 153q signals. Also included are direct digital synthesizer (DDS) circuits 156, 158 that produce respective I 157i, 159i and Q 157q, 159q signals. The analog I 153i and Q 153q signals are mixed with the Q 157q and I 157i signals, respectively, from the first DDS 156, and with the I 159i and Q 159q signals, respectively, from the second DDS 158. The first set of mixed signals 161i, 161q is summed in a signal summing circuit 164 to produce the first input LO signal 131a. The second set of mixed signals 163*i*, 163*q* is summed in another signal summing circuit 166 to produce a second input LO signal 131*b*.

As will be readily appreciated by one of ordinary skill in the art, the mixing of the respective I and Q phases of the various analog and DDS LO signals, as depicted in FIG. 8, results in the generation of two single sideband (SSB) signals as the LO signals 131*a*, 131*b*. More particularly, the first 131*a* and second 131*b* input LO signals are the lower (LSB) and upper (USB) sidebands, respectively, of the mixing product of the frequency of the analog LO signals 153*i*, 153*q* and frequency of the DDS signals 157*i*, 157*q*, 159*i*, 159*q*.

Alternatively, a second analog LO signal source could be used instead of the two DDS sources 156, 158. However, the two analog signal sources (including the LO signal source 152 shown) would exhibit different phase noise properties. By using DDS signal sources as the second LO signal source will result in nearly identical phase noise characteristics being introduced as part of the frequency down conversion of the incoming MIMO signals 23*ar*, 23*br*. This will be beneficial for downstream MIMO signal analysis which often requires signals with identical phase noise characteristics for proper analysis. Additionally, a single DDS signal source can be used in place of two independent DDS signal sources. However, using independent signal sources 156, 158 allows for different DDS signal frequencies to be used, as well as in the case of identical DDS signal frequencies, independent adjustment of the amplitudes and phases of the respective DDS signals, thereby allowing for fine phase or frequency adjustments to achieve the best possible rejection of undesired signal sidebands produced as mixing products. Further, the use of DDS signal sources allows for virtually instantaneous amplitude, phase and frequency adjustments of the DDS signals, due to the nature of DDS signal generation. (Such DDS signal sources can also be included as part of the VSGs needed in a typical test system, e.g., as depicted in FIG. 2.)

Figure 9:
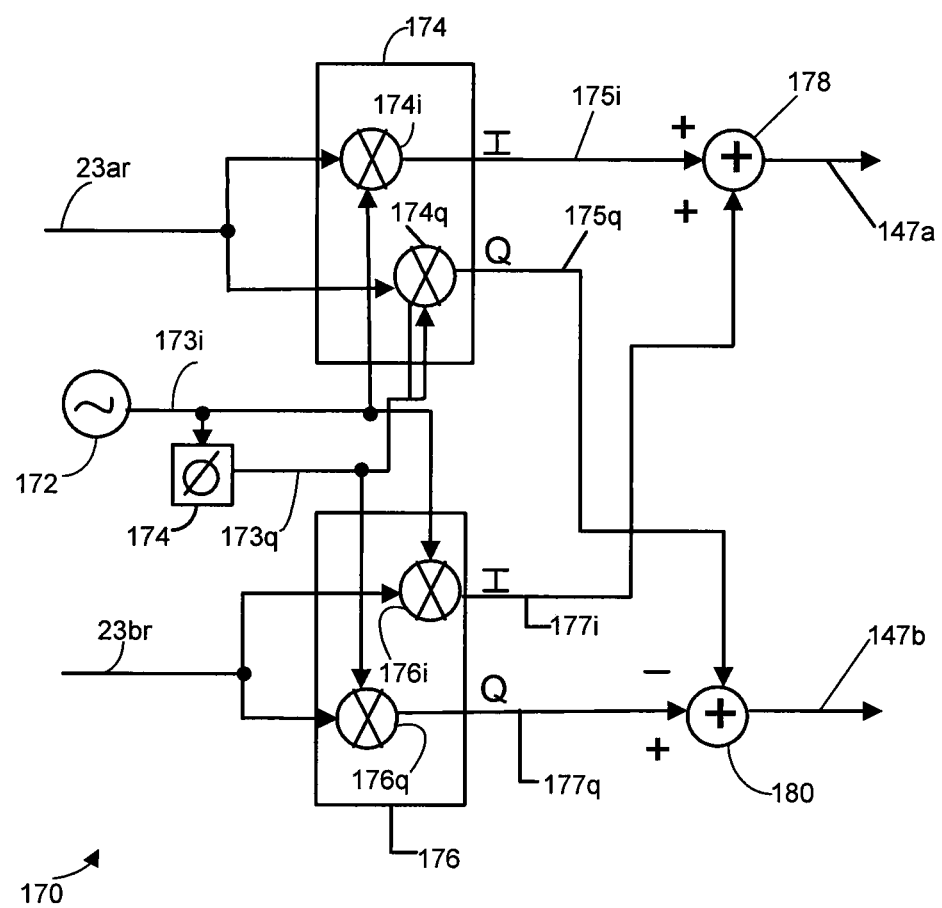
FIG. 9 is a functional block diagram of an exemplary embodiment of the input frequency conversion circuitry for use with the circuitry of FIG. 7.

Referring to FIG. 9, an exemplary embodiment 170 of input frequency conversion circuitry for use with the circuitry of FIG. 7 can include image-reject mixing circuits 174, 176 and signal summing circuits 178, 180, interconnected substantially as shown, for driving the ADCs 136*a*, 136*b*. Such image-reject mixer circuits 174, 176 include respective mixers 174*i*, 174*q*, 176*i*, 176*q* and quadrature hybrid circuitry (not shown), and are well known in the art. The MIMO signal components 23*ar*, 23*br* are mixed within the image-reject mixers 174, 176 with quadrature LO signals 173*i*, 173*q* provided by an LO signal source 172 (e.g., a PLL with a VCO) and phase shifter 174 to produce respective I signals 175*i*, 177*i* and Q signals 175*q*, 177*q*. The resulting I signals 175*i*, 177*i* are summed in a signal summing circuit 178 to produce the first frequency converted signal 147*a*, while the resulting Q signals 175*q*, 177*q* are differentially summed (mutually subtracted) in the second summing circuit 180 to produce the second frequency converted signal 147*b*. (One advantage of this embodiment 170 is the need for only one LO signal source 172.)

A single wide-bandwidth VSA can be further advantageous for testing data packets created under emerging standards, such as IEEE 802.11 ac, where two 80 MHz signals are used. Alternatively, it can be used for testing systems in which the VSA bandwidth is just twice that of the signal bandwidth. In such cases, the data packet sent by one transmitter is sampled, following which the data packet sent by another transmitter is sampled, and the two sample signals are combined. This can be done with switching circuits or by using fast DDS signals. Also, where "masks" are wider than signal bandwidths, one can switch LO frequencies between data packets, and in effect stitch together the resulting packets end to end with the mask spectrum.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including signal conversion circuitry for converting a multiple input, multiple output (MIMO) packet data signal transmission to a plurality of data samples, comprising:

input signal conversion circuitry responsive to at least first and second radio frequency (RF) signals and at least first and second local oscillator (LO) signals by converting said at least first and second RF signals to at least first and second frequency converted signals, wherein said at least first and second RF signals have a common RF carrier frequency, include at least first and second data streams, and form at least a portion of a MIMO packet data signal transmission;

signal combining circuitry coupled to said input signal conversion circuitry to combine said at least first and second frequency converted signals to provide at least one combined signal; and output signal conversion circuitry coupled to said signal combining circuitry and responsive to said at least one combined signal by providing a plurality of data signals having a common nominal frequency and including data samples corresponding to said at least first and second data streams;

wherein said input signal conversion circuitry comprises
first mixer circuitry to mix at least said first RF and first and second LO signals to provide a portion of said at least first and second frequency converted signals as first substantially mutually quadrature signals, and
second mixer circuitry to mix at least said second RF and first and second LO signals to provide another portion of said at least first and second frequency converted signals as second substantially mutually quadrature signals, and
said signal combining circuitry is coupled to said first and second mixer circuitries to combine first ones of said first and second substantially mutually quadrature signals to provide a first combined signal, and to combine second ones of said first and second substantially mutually quadrature signals to provide a second combined signal, wherein said first and second combined signals have a common nominal signal frequency and mutually distinct signal phases.

2. The apparatus of claim 1, wherein said at least first and second LO signals have unequal LO carrier frequencies.

3. The apparatus of claim 1, wherein said signal combining circuitry comprises signal summing circuitry to sum said at least first and second frequency converted signals to provide said at least one combined signal.

4. The apparatus of claim 1, wherein said input signal conversion circuitry comprises at least first and second analog mixing circuits responsive to said at least first and second RF signals and said at least first and second LO signals by mixing said first RF and LO signals and mixing said second RF and LO signals to provide said at least first and second frequency converted signals.

5. The apparatus of claim 1, wherein said signal combining circuitry comprises:
   first signal summing circuitry to sum said first ones of said first and second substantially mutually quadrature signals to provide said first combined signal; and
   second signal summing circuitry to differentially sum said second ones of said first and second substantially mutually quadrature signals to provide said second combined signal.

6. The apparatus of claim 1, further comprising LO circuitry to provide said at least first and second LO signals.

7. The apparatus of claim 6, wherein said LO circuitry comprises:
   LO signal source circuitry to provide said first LO signal; and
   signal phase conversion circuitry coupled to said LO signal source circuitry and responsive to said first LO signal by providing said second LO signal, wherein said first and second LO signals have substantially mutually quadrature signal phases.

8. An apparatus including signal conversion circuitry for converting a multiple input, multiple output (MIMO) packet data signal transmission to a plurality of data samples, comprising:
   input signal conversion circuitry responsive to at least first and second radio frequency (RF) signals and at least first and second local oscillator (LO) signals by converting said at least first and second RF signals to at least first and second frequency converted signals, wherein said at least first and second RF signals have a common RF carrier frequency, include at least first and second data streams, and form at least a portion of a MIMO packet data signal transmission;
   signal combining circuitry coupled to said input signal conversion circuitry to combine said at least first and second frequency converted signals to provide at least one combined signal; and
   output signal conversion circuitry coupled to said signal combining circuitry and responsive to said at least one combined signal by providing a plurality of data signals having a common nominal frequency and including data samples corresponding to said at least first and second data streams;
   wherein
      said output signal conversion circuitry comprises
         first signal conversion circuitry responsive to said at least one combined signal by providing at least a first digital signal,
         digital filter circuitry coupled to said first signal conversion circuitry to filter said at least a first digital signal to provide at least a first filtered signal, and
         second signal conversion circuitry coupled to said digital filter circuitry and responsive to said at least a first filtered signal by providing said plurality of data signals, and
      said first signal conversion circuitry comprises
         signal mixing circuitry responsive to at least substantially mutually quadrature LO signals and said at least one combined signal by providing at least substantially mutually quadrature analog signals, and
         analog-to-digital conversion (ADC) circuitry coupled to said signal mixing circuitry and responsive to said at least substantially mutually quadrature analog signals by providing at least first and second digital signals.

9. The apparatus of claim 8, wherein said first signal conversion circuitry comprises analog-to-digital conversion (ADC) circuitry.

10. The apparatus of claim 8, wherein said digital filter circuitry comprises a digital signal processor (DSP).

11. An apparatus including signal conversion circuitry for converting a multiple input, multiple output (MIMO) packet data signal transmission to a plurality of data samples, comprising:
   input signal conversion circuitry responsive to at least first and second radio frequency (RF) signals and at least first and second local oscillator (LO) signals by converting said at least first and second RF signals to at least first and second frequency converted signals, wherein said at least first and second RF signals have a common RF carrier frequency, include at least first and second data streams, and form at least a portion of a MIMO packet data signal transmission;
   signal combining circuitry coupled to said input signal conversion circuitry to combine said at least first and second frequency converted signals to provide at least one combined signal; and
   output signal conversion circuitry coupled to said signal combining circuitry and responsive to said at least one combined signal by providing a plurality of data signals having a common nominal frequency and including data samples corresponding to said at least first and second data streams;
   wherein
      said output signal conversion circuitry comprises
         first signal conversion circuitry responsive to said at least one combined signal by providing at least a first digital signal,
         digital filter circuitry coupled to said first signal conversion circuitry to filter said at least a first digital signal to provide at least a first filtered signal, and
         second signal conversion circuitry coupled to said digital filter circuitry and responsive to said at least a first filtered signal by providing said plurality of data signals, and
      said second signal conversion circuitry comprises frequency rotation circuitry.

12. The apparatus of claim 11, wherein said first signal conversion circuitry comprises analog-to-digital conversion (ADC) circuitry.

13. The apparatus of claim 11, wherein said digital filter circuitry comprises a digital signal processor (DSP).

14. An apparatus including signal conversion circuitry for converting a multiple input, multiple output (MIMO) packet data signal transmission to a plurality of data samples, comprising:
   input signal conversion circuitry responsive to at least first and second radio frequency (RF) signals and at least first and second local oscillator (LO) signals by converting said at least first and second RF signals to at least first and second frequency converted signals, wherein said at least first and second RF signals have a common RF carrier frequency, include at least first and second data streams, and form at least a portion of a MIMO packet data signal transmission;
   signal combining circuitry coupled to said input signal conversion circuitry to combine said at least first and second frequency converted signals to provide at least one combined signal;

output signal conversion circuitry coupled to said signal combining circuitry and responsive to said at least one combined signal by providing a plurality of data signals having a common nominal frequency and including data samples corresponding to said at least first and second data streams; and LO circuitry to provide said at least first and second LO signals, wherein said LO circuitry comprises
- phase lock loop (PLL) circuitry to provide substantially mutually quadrature PLL signals,
- direct digital synthesis (DDS) circuitry to provide substantially mutually quadrature DDS signals, and
- signal combining circuitry coupled to said PLL circuitry and said DDS circuitry to combine said substantially mutually quadrature PLL signals and substantially mutually quadrature DDS signals to provide at least said first and second LO signals.

15. An apparatus including signal conversion circuitry for converting a multiple input, multiple output (MIMO) packet data signal transmission to a plurality of data samples, comprising:

input signal conversion circuitry responsive to at least first and second radio frequency (RF) signals and at least first and second local oscillator (LO) signals by converting said at least first and second RF signals to at least first and second frequency converted signals, wherein said at least first and second RF signals have a common RF carrier frequency, include at least first and second data streams, and form at least a portion of a MIMO packet data signal transmission;

signal combining circuitry coupled to said input signal conversion circuitry to combine said at least first and second frequency converted signals to provide at least one combined signal;

output signal conversion circuitry coupled to said signal combining circuitry and responsive to said at least one combined signal by providing a plurality of data signals having a common nominal frequency and including data samples corresponding to said at least first and second data streams; and LO circuitry to provide said at least first and second LO signals, wherein said LO circuitry comprises
- phase lock loop (PLL) circuitry to provide substantially mutually quadrature PLL signals,
- first direct digital synthesis (DDS) circuitry to provide first substantially mutually quadrature DDS signals,
- second DDS circuitry to provide second substantially mutually quadrature DDS signals,
- first signal combining circuitry coupled to said PLL circuitry and said first DDS circuitry to combine said substantially mutually quadrature PLL signals and first substantially mutually quadrature DDS signals to provide at least said first LO signal, and
- second signal combining circuitry coupled to said PLL circuitry and said second DDS circuitry to combine said substantially mutually quadrature PLL signals and second substantially mutually quadrature DDS signals to provide at least said second LO signal.

16. A method of converting a multiple input, multiple output (MIMO) packet data signal transmission to a plurality of data samples, comprising:

converting, in accordance with at least first and second local oscillator (LO) signals, at least first and second RF signals to at least first and second frequency converted signals, wherein said at least first and second RF signals have a common RF carrier frequency, include at least first and second data streams, and form at least a portion of a MIMO packet data signal transmission;

combining said at least first and second frequency converted signals to provide at least one combined signal; and converting said at least one combined signal to a plurality of data signals having a common nominal frequency and including data samples corresponding to said at least first and second data streams;

wherein
said converting, in accordance with at least first and second local oscillator (LO) signals, at least first and second RF signals to at least first and second frequency converted signals comprises
- mixing at least said first RF and first and second LO signals to provide a portion of said at least first and second frequency converted signals as first substantially mutually quadrature signals, and
- mixing at least said second RF and first and second LO signals to provide another portion of said at least first and second frequency converted signals as second substantially mutually quadrature signals, and said combining said at least first and second frequency converted signals to provide at least one combined signal comprises
- combining first ones of said first and second substantially mutually quadrature signals to provide a first combined signal, and
- combining second ones of said first and second substantially mutually quadrature signals to provide a second combined signal, wherein said first and second combined signals have a common nominal signal frequency and mutually distinct signal phases.

17. The method of claim 16, wherein said converting said at least one combined signal to a plurality of data signals having a common nominal frequency and including complex data samples corresponding to said at least first and second data streams comprises:

converting said at least one combined signal to at least a first digital signal;

digitally filtering said at least a first digital signal to provide at least a first filtered signal; and converting said at least a first filtered signal to said plurality of data signals.

* * * * *